(12) United States Patent
Yamazaki (10) Patent No.: US 8,196,561 B2
(45) Date of Patent: Jun. 12, 2012

(54) MULTIPOINT IGNITION ENGINE

(75) Inventor: Masahiro Yamazaki, Yamagata (JP)

(73) Assignee: YGK Co., Ltd., Yamagata (JP)

( * ) Notice: Subject to any disclaimer, the term of this patent is extended or adjusted under 35 U.S.C. 154(b) by 176 days.

(21) Appl. No.: 12/734,250

(22) PCT Filed: Apr. 9, 2008

(86) PCT No.: PCT/JP2008/057371
§ 371 (c)(1),
(2), (4) Date: Apr. 21, 2010

(87) PCT Pub. No.: WO2009/054154
PCT Pub. Date: Apr. 30, 2009

(65) Prior Publication Data
US 2010/0236504 A1     Sep. 23, 2010

(30) Foreign Application Priority Data
Oct. 22, 2007   (JP) .................. 2007-274025

(51) Int. Cl.
*F02P 15/02*    (2006.01)
*F02P 15/00*    (2006.01)

(52) U.S. Cl. ....................... 123/310; 123/638

(58) Field of Classification Search .................. 123/310, 123/638, 661, 665, 666
See application file for complete search history.

(56) References Cited

U.S. PATENT DOCUMENTS

| | | | | |
|---|---|---|---|---|
| 2,756,732 A | * | 7/1956 | Olson ..................... | 123/79 C |
| 4,133,330 A | | 1/1979 | Nakajima et al. | |
| 4,202,306 A | | 5/1980 | Nakajima et al. | |
| 4,452,198 A | * | 6/1984 | Berland .................... | 123/310 |
| 5,261,367 A | | 11/1993 | Yamamoto et al. | |
| 5,408,968 A | | 4/1995 | Yamamoto et al. | |

FOREIGN PATENT DOCUMENTS

| | | |
|---|---|---|
| JP | 51-85016 | 7/1976 |
| JP | 52-109007 A | 9/1977 |
| JP | 58-12457 A | 3/1983 |
| JP | 62-182422 A | 8/1987 |
| JP | 05-059951 A | 3/1993 |
| JP | 05-302561 A | 11/1993 |
| JP | 3105235 | 9/2000 |
| JP | 2006-266184 A | 10/2006 |
| JP | 2006-283571 A | 10/2006 |
| JP | 2007-239627 A | 9/2007 |
| JP | 2007-270844 A | 10/2007 |

* cited by examiner

*Primary Examiner* — Mahmoud Gimie
(74) *Attorney, Agent, or Firm* — Rabin & Berdo, P.C.

(57) ABSTRACT

A bottom face of a cylinder head (3) defining a combustion chamber (1) is formed substantially in a shape of a spherical shell, and ignition points (21) are arranged in three or more on a concentric circle of 55 to 70% of a diameter of a cylinder block (30) or the vicinity thereof, and combustion is performed with an air excess ratio of the combustion chamber (1) of 1.5 or more.

5 Claims, 7 Drawing Sheets

MULTIPOINT IGNITION ENGINE

TECHNICAL FIELD

The present invention relates to a multipoint ignition engine that realizes ultra lean combustion.

BACKGROUND ART

In a spark ignition engine, it is known that ignition occurs at the center of a combustion chamber. Also, in JP50-9454A, two ignition plugs are disposed separately from each other in order to expedite combustion.

SUMMARY OF INVENTION

However, in an inexpensive small-sized engine for power generation or heat pump, for example, in order to make an air excess ratio extremely large (lean), to reduce a nitrogen oxide (NOx) level and to obtain high heat efficiency, a combustion speed needs to be improved rapidly than before, and a technique to ignite ultra lean mixture and rapidly burn it is indispensable.

Here, there is a lean limit where a flame propagation speed is lowered and rotation of an engine becomes unstable if the mixture becomes lean, and this lean limit should be raised than before.

The present invention has an object to realize ultra lean combustion by the shape of a combustion chamber and the number and a positional relationship of ignition points.

In a multipoint ignition engine according to the present invention, in a spark ignition engine provided with a cylinder block, a piston sliding inside the cylinder block, a cylinder head provided at an upper part of the cylinder block, and ignition points for igniting a mixture in a combustion chamber defined by the cylinder block, the piston, and the cylinder head, a bottom face of the cylinder head defining the combustion chamber is formed substantially in a shape of a spherical shell, the ignition points are arranged in three or more on a concentric circle of 55 to 70% of a diameter of the cylinder block or its vicinity, and combustion is performed at an air excess ratio in the combustion chamber of 1.5 or more.

According to the present invention, even with an extremely lean premixture mixed uniformly, simultaneous ignition at three points or more and stable combustion are realized, and since a part of the combustion chamber is formed as a spherical shell, an effect of gas fluidity by swirl or squish can be improved. Therefore, the air excess ratio can be raised so as to reduce NOx, and high heat efficiency can be realized.

DESCRIPTION OF EMBODIMENTS

Details of this embodiment will be described below referring to the attached drawings.

Figure 1:
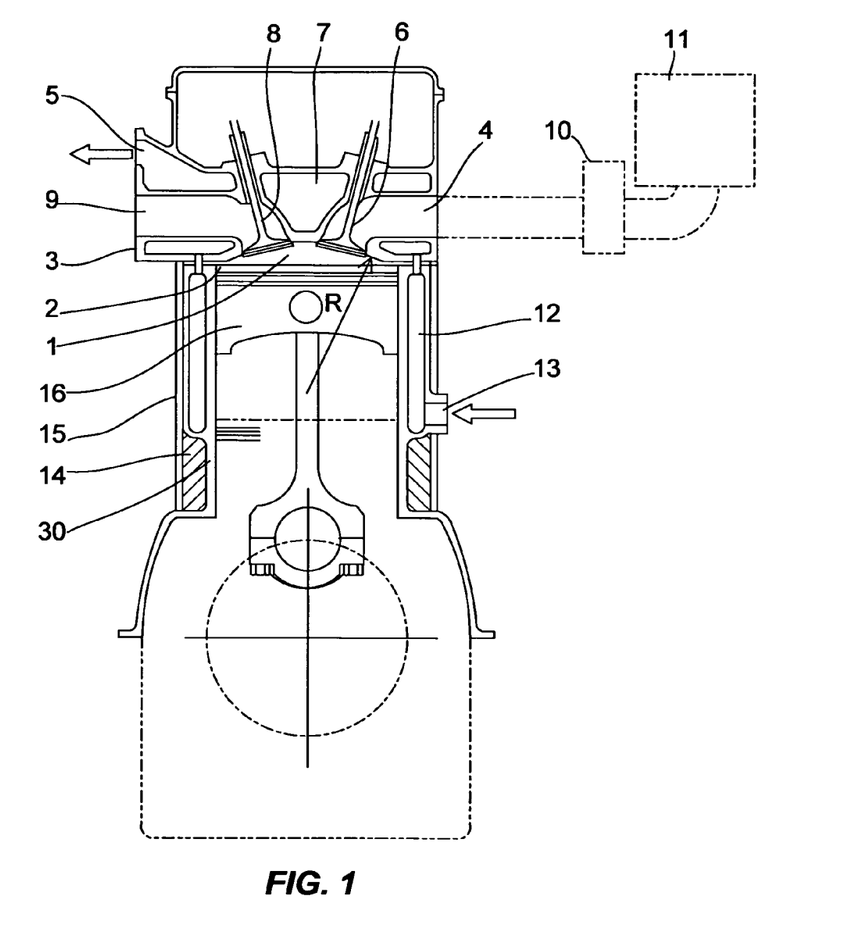
FIG. 1 is an entire configuration diagram illustrating a configuration of a multipoint ignition engine in this embodiment.

FIG. 1 is an entire configuration diagram illustrating a configuration of a multipoint ignition engine in this embodiment. A piston 16 is disposed vertically slidably in a cylinder and connected to a crank through a connecting rod. FIG. 1 shows a case in which the piston 16 is at a top dead center, a combustion chamber 1 is defined by a top face of the piston and an inner wall of a cylinder head 3 in this state, and a bottom face of the cylinder head 3 defining the combustion chamber 1 is in a thin spherical shell shape with a radius R. An intake valve 6 and an exhaust valve 8 are provided facing to the combustion chamber 1, and an included angle between them is set small so as to be within 30°.

A capacity of the combustion chamber 1 is determined so that a compression ratio, which is a value obtained by dividing the capacity of the combustion chamber 1 when the piston 16 is at a bottom dead center by the capacity of the combustion chamber 1 when the piston 16 is at the top dead center, is high. For example, the compression ratio when a fuel is natural gas is 13.2 or more.

To the combustion chamber 1, an intake port 4 is connected through the intake valve 6, and an exhaust port 9 is connected through the exhaust valve 8. Air filtered by an air cleaner 11 is supplied with the fuel by an injector 10 and taken into the combustion chamber 1 as mixture according to opening/closing of the intake valve 6. This mixture is preferably mixed uniformly in the intake port before it enters the combustion chamber 1. Also, exhaust gas after combustion is exhausted to the exhaust port 9 according to opening/closing of the exhaust valve 8.

On a portion other than an outer peripheral portion of the cylinder block 30 and the intake/exhaust ports 4 and 9 of the cylinder head 3, water jackets 7 and 12 are disposed, respectively, and cooling water flows from a cooling-water inlet 13 into the water jacket 12 of the cylinder block 30 and flows out to the outside from a cooling-water outlet 5 through the water jacket 7 of the cylinder head 3. The water jacket 12 is disposed on the outer peripheral portion of the cylinder block 30 and an upper region above an upper end of the piston 16 when the piston 16 is at the bottom dead center.

Also, on an outer face of the cylinder bock 30 and a region below the above-mentioned water jacket 12, an insulating material 14 for suppressing heat exchange between the cylinder block 30 and the outside is disposed. Similarly, an insulating material 15 is also disposed above the cylinder block 30 and on the outer peripheral portion of the water jacket 12.

By using heat deprived of from the engine by the cooling water for hot-water supply and heating, heat efficiency can be improved as an entire system, and by reducing the heat directly emitted from the surface of the engine to the air by radiation or convection by the insulating materials 14 and 15, waste heat can be effectively utilized.

Figure 2:
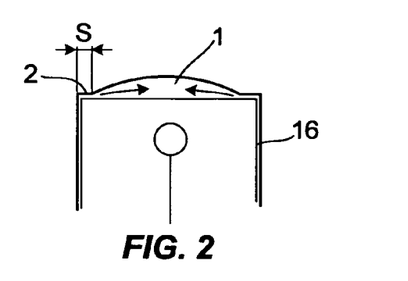
FIG. 2 is an enlarged diagram for explaining a combustion chamber in FIG. 1.
Figure 3:
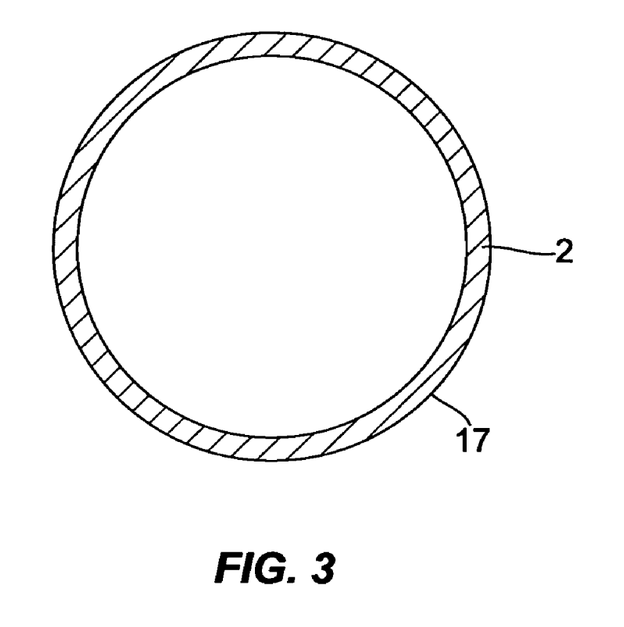
FIG. 3 is a perspective view of FIG. 2 seen from above.

FIG. 2 is an enlarged diagram of the combustion chamber 1 in FIG. 1 when the piston 16 is at the top dead center. FIG. 3 is a diagram of a squish area 2 in FIG. 2 seen from above. The squish area 2 is formed on the outer periphery portion of the combustion chamber 1, and its thickness is approximately a head gasket. In this squish area 2, since an interval between the piston 16 top face and the bottom face of the cylinder head 3 is reduced immediately before the piston 16 reaches the top dead center, the mixture whose pressure has been raised is pushed out toward the center part of the combustion chamber 1.

If a width of the squish area 2 is too large, flame cannot reach the squish area 2 but is cooled and extinguished so that unburned hydrocarbon remains. Also, since cooling loss is increased by this unburned hydrocarbon, heat efficiency is deteriorated. Thus the width S of the squish area 2 is approximately 2.5 mm or less.

Figure 4:
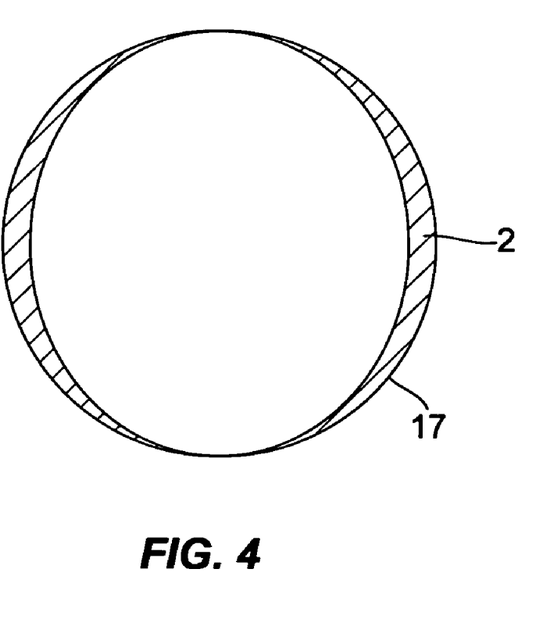
FIG. 4 is another embodiment of FIG. 3.

Also, the shape of the squish area 2 may be in a crescent moon shape as shown in FIG. 4 instead of an annular shape as in FIG. 3.

Figure 5:
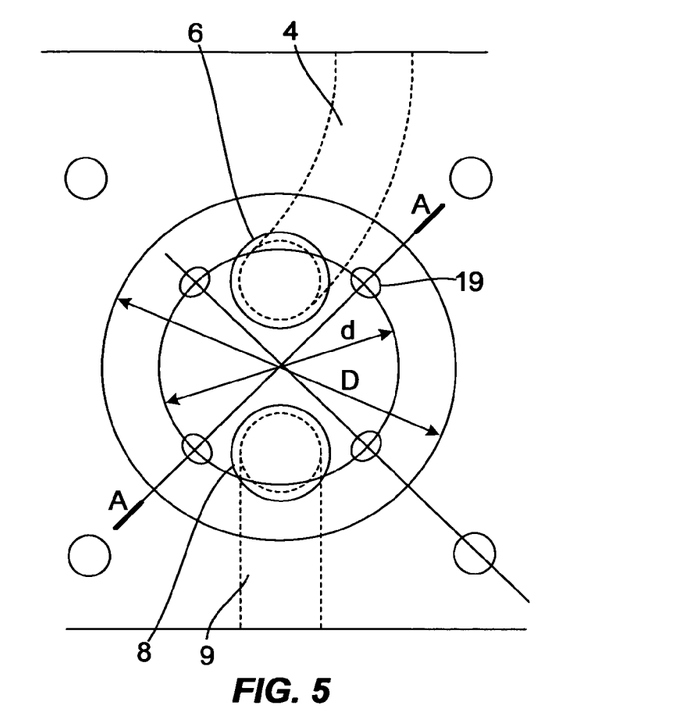
FIG. 5 is a sectional view obtained by cutting FIG. 1 in a direction perpendicular to a sliding direction of a piston.
Figure 7:
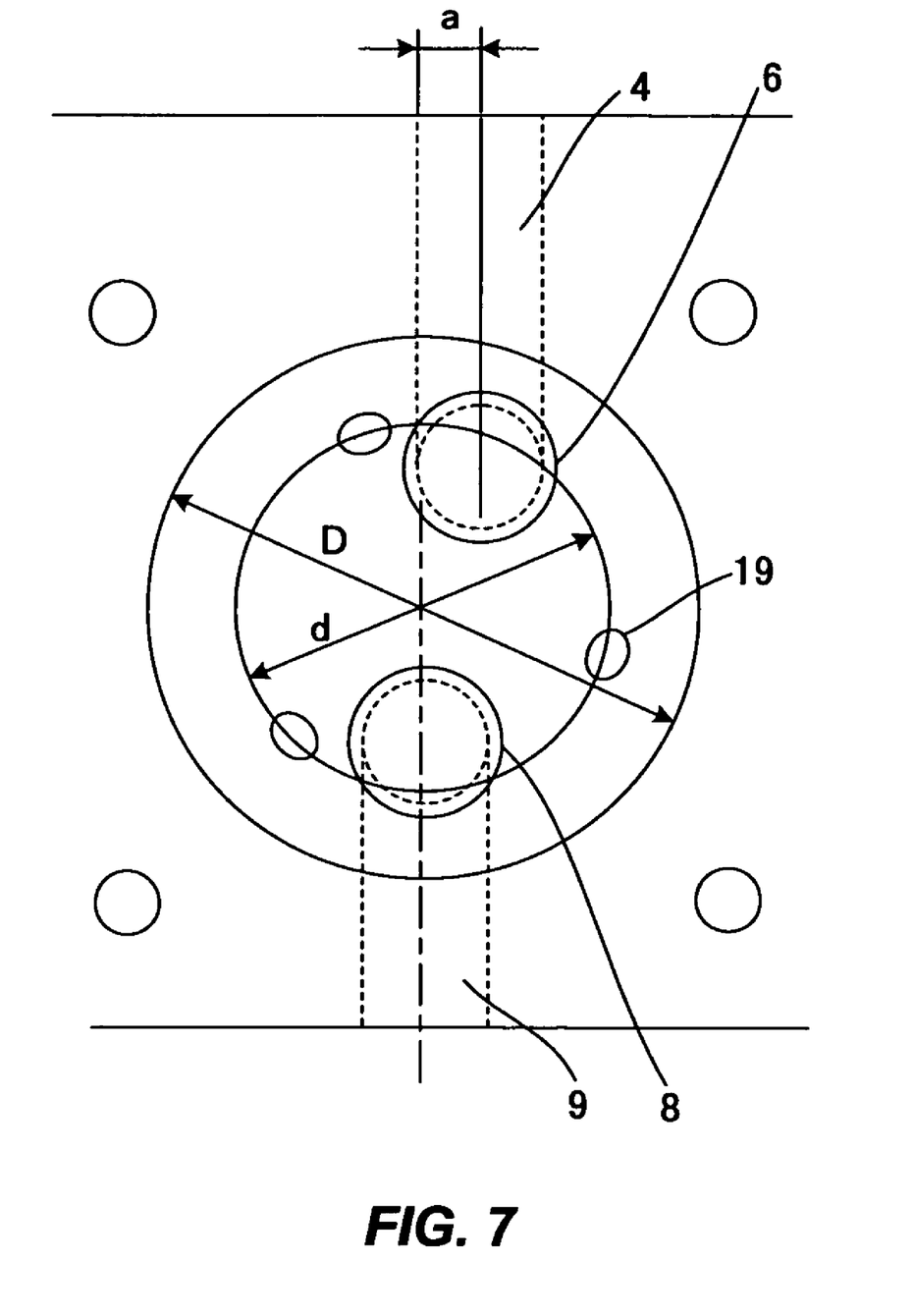
FIG. 7 is another embodiment of FIG. 5.

FIG. 5 is a sectional view obtained by cutting the combustion chamber 1 in FIG. 1 in a direction perpendicular to the sliding direction of the piston 16. As shown in FIG. 5, a curved portion is given to the intake port 4 so that a swirl flow, that is, swirl can be given to the mixture. Also, as shown in FIG. 7, a center axis of the intake port 4 may be offset from the cylinder center, that is, the center of the combustion chamber 1 only by a.

The squish or swirl is intended to promote mixture and not to expedite movement of flames according to gas fluidity.

In this embodiment, in order to reduce combustion time of the mixture, three or more pieces of ignition plugs 20 are disposed. In FIGS. 5 and 7, instead of the ignition plug 20, an end portion 19 in a combustion-chamber wall face 22 of a mounting screw for the ignition plug 20, that is, a plug hole 19 is shown. An ignition gap center 21 of the ignition plug 20 is located substantially at the center of the plug hole 19.

In FIG. 5, four ignition points 21 are provided and arranged at symmetrical or substantially symmetrical positions on a circumference of a diameter d. The diameter d of the circle on which the ignition points 21 are arranged is set to become d=(0.55 to 0.7)×D. Here, D is a diameter of the cylinder.

Figure 6:
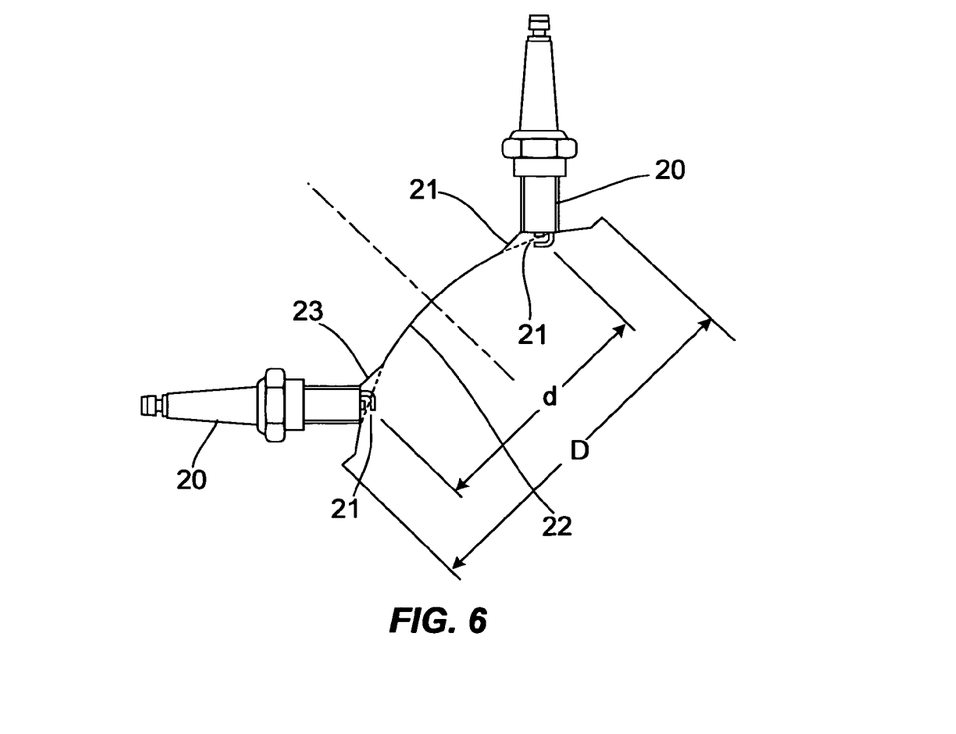
FIG. 6 is an A-A sectional view of FIG. 5.

FIG. 6 is an A-A sectional view of FIG. 5. A conical dent 23 is disposed in the cylinder head 3 so that the ignition gap center 21 of the ignition plug 20 is located on the circumference of a base circle R along the combustion-chamber wall face 22.

In FIG. 7, three ignition points 21 are disposed, and the three ignition points 21 are arranged by offsetting the intake valve 6 and the intake port 4 from the cylinder center only by a so that a distance among the points 21 is equal. That is, with respect to a straight line connecting the arbitrary one ignition point 21 and the cylinder center, the remaining two ignition points 21 are located at line-symmetrical positions. In this case, too, d is set as d=(0.55 to 0.7)×D similarly to the case of four points.

Figure 8:
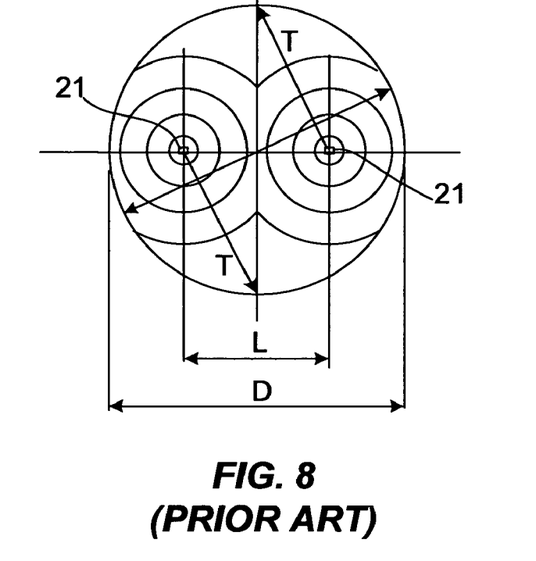
FIG. 8 is a diagram corresponding to FIGS. 5 and 7 in the case of prior-art two-point ignition.

FIG. 8 is a diagram corresponding to the FIGS. 5 and 7 in the case of a prior-art two-point ignition engine. As for a distance L between the two ignition gaps, L=0.5×D is considered to be optimal. This is because supposing that a flame progresses concentrically, a proportion of an initial combustion mass before interference of the flame is to be made large. However, a distance from the ignition point 21 to the farthest position is T, and a large pressure difference from the vicinity of the ignition point 21 is generated at this position immediately before combustion is finished, and there is a problem that leaning of mixture is limited.

Subsequently, a method of determining the number, arrangement, air excess ratio and ignition timing of the ignition points 21 of the multipoint ignition engine in this embodiment will be described referring to FIGS. 9 to 11.

Figure 9:
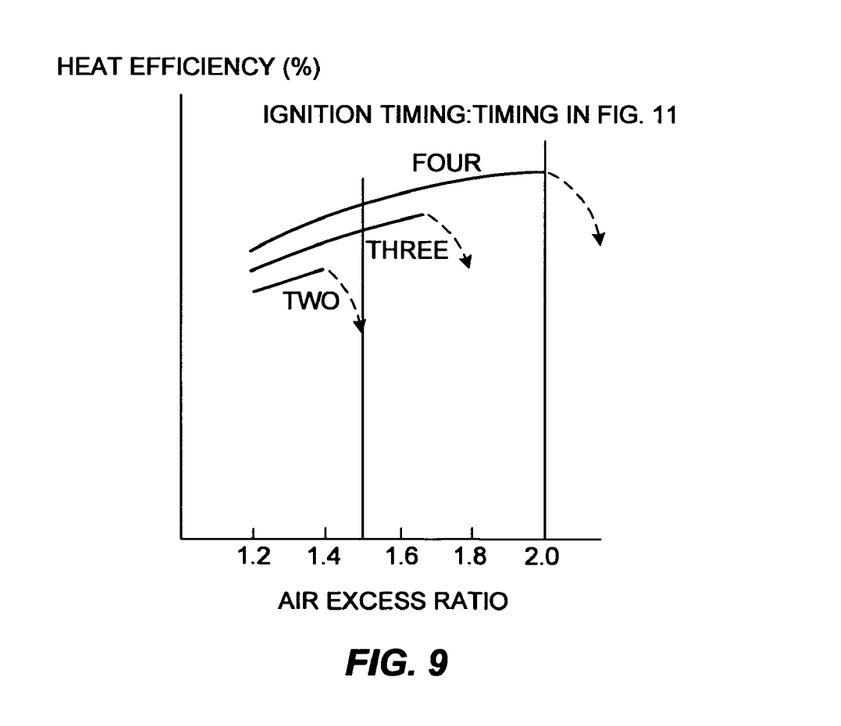
FIG. 9 is a map illustrating a relationship among an air excess ratio, heat efficiency, and the number of ignition points when ignition timing θ is constant.

FIG. 9 is a map illustrating a relationship among the air excess ratio, heat efficiency, and the number of ignition points when the ignition timing θ is constant. A broken line portion in the figure means that too much leaning makes combustion unstable and the heat efficiency is lowered. The air excess ratio on the abscissa axis is a value obtained by dividing an air/fuel ratio by a theoretical air/fuel ratio, and the air excess ratio is 1 when the air/fuel ratio is the theoretical air/fuel ratio.

The heat efficiency η ignition timing θ when the target NOx level can be achieved is improved if the air excess ratio is increased. However, the air excess ratio in the case of two-point ignition is limited to approximately 1.4. On the other hand, stable operation can be realized in the case of the three-point ignition with the air excess ratio up to approximately 1.7 and in the case of four-point ignition with the air excess ratio up to approximately 2.0. Therefore, combustion with the number of ignition points of 3 or more and the air excess ratio of 1.5 or more is preferable.

Figure 10:
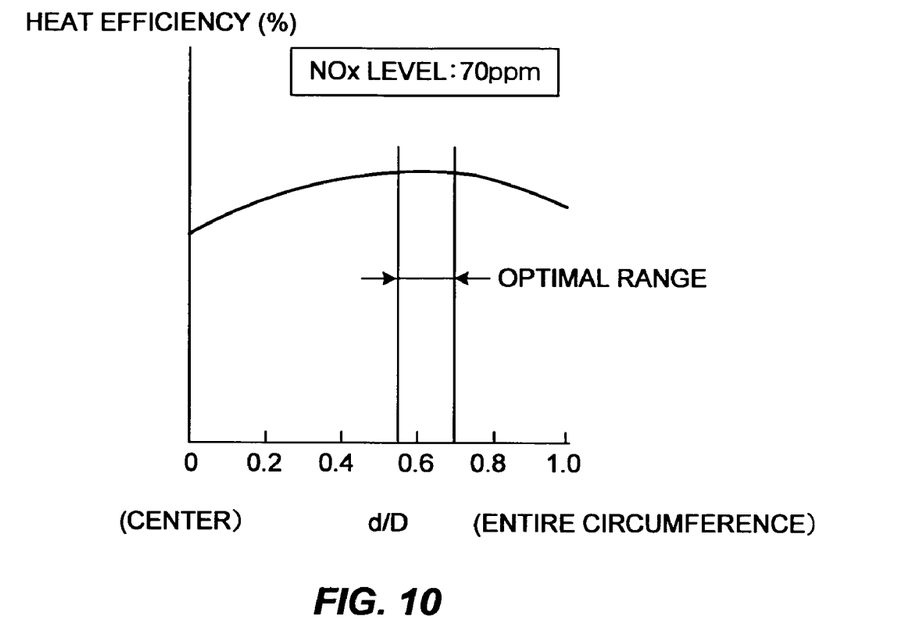
FIG. 10 is a map illustrating a relationship between d/D and heat efficiency when a NOx level is constant.

FIG. 10 is a map illustrating a relationship between d/D and the heat efficiency when the NOx level is constant. 0 on the abscissa axis is a state with one-point ignition at the center of the combustion chamber 1 and 1 on the abscissa axis is a state in which four ignition points are arranged on the entire circumference. With increase of an interval between the ignition points 21, the heat efficiency is improved and gradually lowered after reaching a peak. However, it is characteristic that the heat efficiency is higher with the multipoint ignition on the entire circumference than the central one-point ignition. As mentioned above the d/D is optimal at 0.55 to 0.7.

Figure 11:
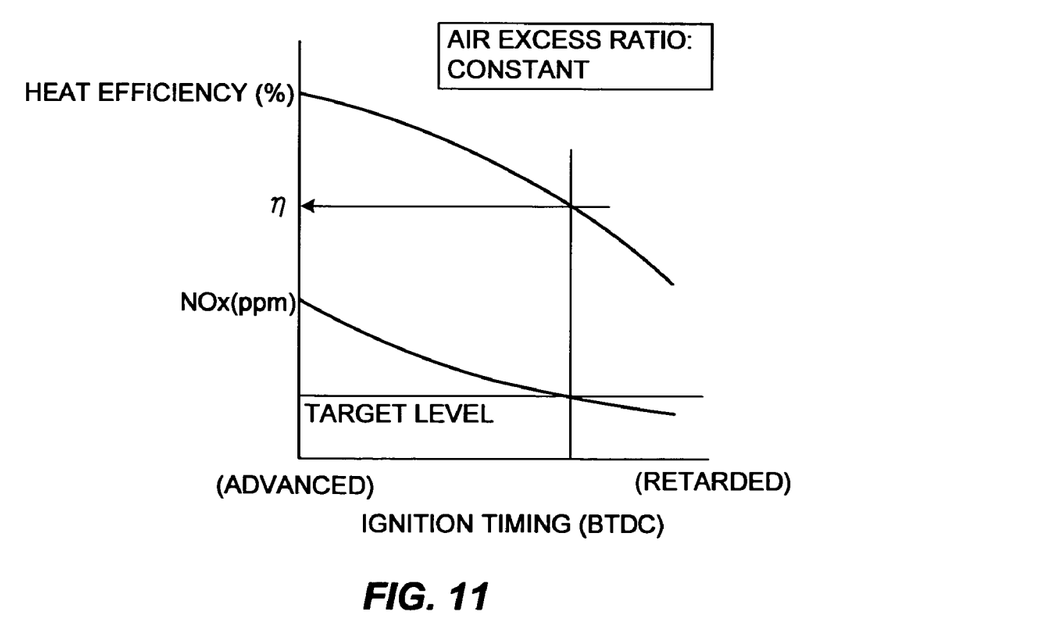
FIG. 11 is a map illustrating a relationship among the ignition timing, the NOx level, and heat efficiency when the air excess ratio is constant.

FIG. 11 is a map illustrating a relationship among the ignition timing, the NOx level, and the heat efficiency when the air excess ratio is constant. In FIG. 11, as the ignition timing is retarded with the constant air excess ratio, the NOx level is rapidly lowered at the beginning but the gradient becomes smaller. On the other hand, the gradient of the heat efficiency is getting larger. That is, if the heat efficiency is set too high, the target NOx level cannot be achieved.

Thus, the ignition timing is retarded, and the ignition timing θ and the heat efficiency with which the target NOx level can be achieved are acquired and they are used as parameters to obtain characteristics in FIGS. 9 and 10. In this way, supposing that the air excess ratio in the case of the three-point ignition is 1.7, for example, the heat efficiency that satisfies the target NOx level of 70 ppm can be acquired.

Figure 12:
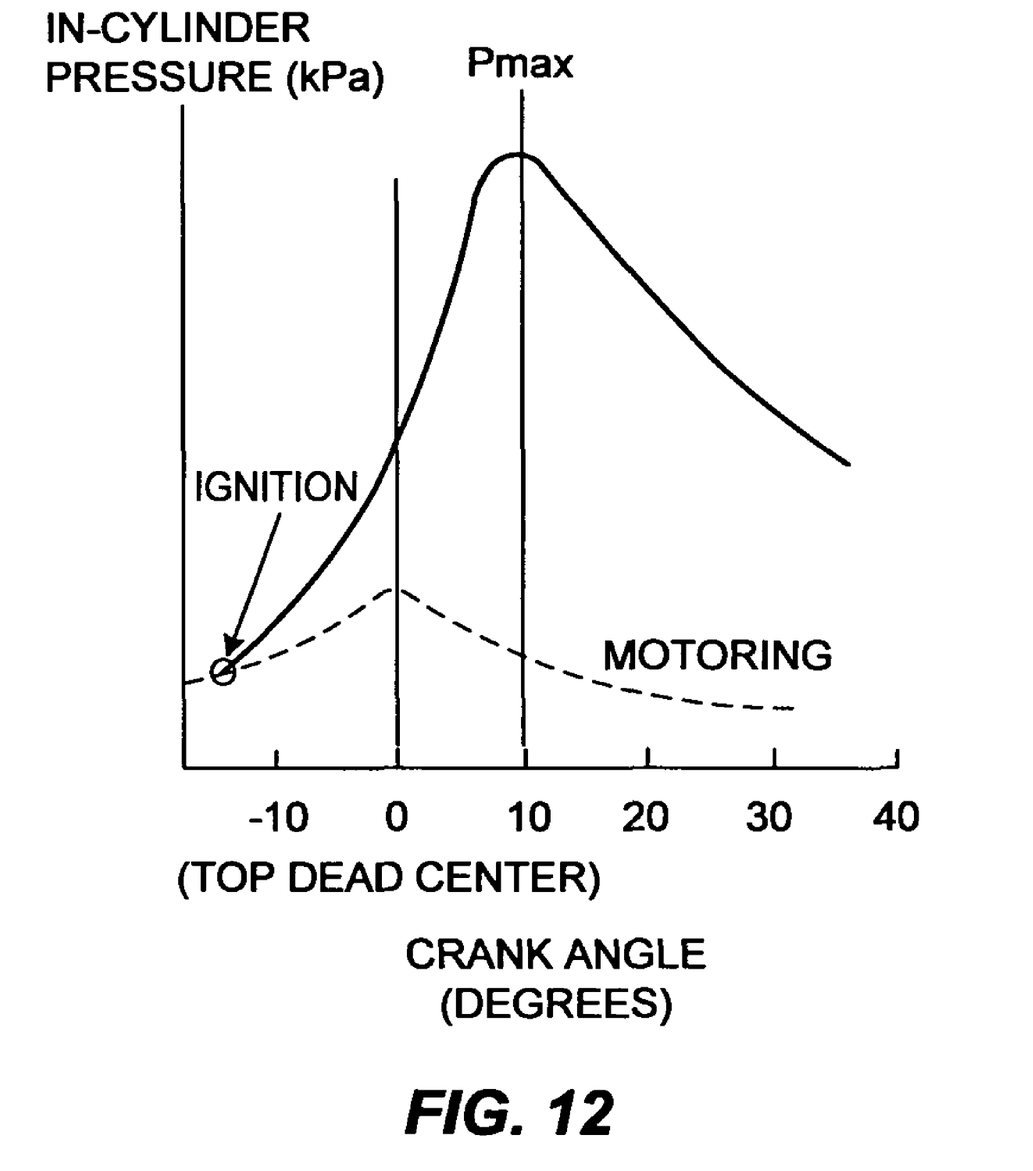
FIG. 12 is a map illustrating a relationship between a crank angle and an in-cylinder pressure.

FIG. 12 is a map illustrating a relationship between a crank angle and an in-cylinder pressure, in which a broken line is a gas pressure characteristic in motoring when only air is compressed and expanded without burning.

The pressure rapidly rises after ignition and falls by expansion after reaching the peak. The peak point is indicated by Pmax. With the spark ignition engine using prior-art mixture which is uniformly mixed, the ignition timing to become Pmax is 15° after the top dead center.

However, with the multipoint ignition engine in this embodiment, since extremely lean mixture with the air excess ratio of 1.7 is stably burned, the ignition timing to become Pmax is 9 to 12°. Since the lean mixture is rapidly burned in the compact combustion chamber 1 with a small surface area, knocking hardly occurs, and θ to give Pmax can be advanced even if the compression ratio is high.

A gas temperature is the highest at Pmax, and if the temperature at this time is 2070K (kelvin, 0 kelvin is −273° C.) or less, the NOx level of 70 ppm can be achieved. For that purpose, combination of leaning and retardation is needed, but the retardation always involves trade-off with the heat efficiency. On the other hand, the leaning can realize both reduction in the NOx level and improvement of the heat efficiency, but stable combustion at leaning needs to be ensured.

Also, if the uniform mixture is distributed in the geometrically symmetrical combustion chamber 1, simultaneous ignition is performed without providing a phase difference between the plurality of ignition plugs. As a result, a control system can be simplified.

The multipoint ignition engine of this embodiment can be applied to any fuel which starts combustion by spark ignition such as gasoline, urban gas, LPG, natural gas, biological fuel and the like.

The invention claimed is:

1. A spark ignition engine comprising:
    a cylinder block;
    a piston sliding inside the cylinder block;
    a cylinder head disposed at an upper part of the cylinder block; and
    ignition points for igniting mixture in a combustion chamber defined by the cylinder block, the piston, and the cylinder head, wherein
    a bottom face of the cylinder head defining the combustion chamber is formed substantially in a spherical shell;
    the ignition points are arranged in three or more on a concentric circle of 55 to 70% of a diameter of the cylinder block or the vicinity thereof; and
    combustion is performed with an air excess ratio in the combustion chamber of 1.5 or more; further comprising
    a connecting rod and a crank connected to the connecting rod for converting a motion of the piston to a rotational motion, wherein ignition timing is set so that an angle of the crank when a pressure in the combustion chamber in an expansion stroke becomes the maximum is 9 to 12° after the piston comes to top dead center.

2. The spark ignition engine according to claim 1, wherein the number of the ignition points is three or four.

3. The spark ignition engine according to claim 1, wherein an intake port for taking intake into the combustion chamber has a curved portion or is offset from a center axis of the cylinder block.

4. The spark ignition engine according to claim 1, wherein the number of the ignition points is three, and an intake port for taking intake into the combustion chamber is offset from a center axis of the cylinder block.

5. The spark ignition engine according to claim 1, further comprising:
    a water jacket disposed on an outer periphery portion of the cylinder block and through which cooling water communicates inside; and
    an insulating material disposed on the outer periphery portion of the cylinder block for suppressing heat transfer between the outer periphery portion and an outside, wherein
    the water jacket is disposed on an upper region above an upper end of the piston when the piston reaches the bottom dead center and the insulating material is disposed on a region below the upper region.

* * * * *